United States Patent
Irons et al.

(10) Patent No.: US 6,744,936 B2
(45) Date of Patent: Jun. 1, 2004

(54) APPARATUS AND METHOD FOR SIMULTANEOUSLY MANAGING PAPER-BASED DOCUMENTS AND DIGITAL IMAGES OF THE SAME

(75) Inventors: Steven W. Irons, Phoenix, AZ (US); Mark F. Wright, Mesa, AZ (US)

(73) Assignee: Imagetag, Inc., Chandler, AZ (US)

( * ) Notice: Subject to any disclaimer, the term of this patent is extended or adjusted under 35 U.S.C. 154(b) by 383 days.

(21) Appl. No.: 10/045,343

(22) Filed: Oct. 25, 2001

(65) Prior Publication Data

US 2002/0111960 A1 Aug. 15, 2002

Related U.S. Application Data

(63) Continuation-in-part of application No. 09/436,130, filed on Nov. 8, 1999, now Pat. No. 6,427,032, which is a continuation-in-part of application No. 09/001,228, filed on Dec. 30, 1997, now Pat. No. 6,192,165.

(51) Int. Cl.[7] .............................................. G06F 17/30
(52) U.S. Cl. .................................... 382/306; 707/104.1
(58) Field of Search ............................. 382/306; 707/1, 707/10, 104.1

(56) References Cited

U.S. PATENT DOCUMENTS

| | | | |
|---|---|---|---|
| 4,985,863 A | 1/1991 | Fujisawa et al. ................ | 707/5 |
| 5,109,439 A | 4/1992 | Froessl ......................... | 382/305 |
| 5,126,540 A | 6/1992 | Kashiwagi et al. .......... | 235/375 |
| 5,155,341 A | 10/1992 | Ohtani et al. ................. | 235/375 |
| 5,179,649 A | 1/1993 | Masuzaki et al. ............ | 715/507 |
| 5,188,464 A | 2/1993 | Aaron .......................... | 400/103 |
| 5,229,587 A | 7/1993 | Kimura et al. ............... | 235/432 |

(List continued on next page.)

OTHER PUBLICATIONS

Wagner, R.R. Electra: an Electronic Article Delivery Service, Database and Expert Systems Applications, 1997. Proceedings., Eighth International Workshop on pp. 272–277, especially p. 272.

*Primary Examiner*—Jack Choules
(74) *Attorney, Agent, or Firm*—Wright Law Group, PLLC; Mark F. Wright

(57) ABSTRACT

According to the preferred embodiments of the present invention, an apparatus and method for simultaneously managing paper-based documents and digital images of the same are disclosed. When used in conjunction with a digital filing apparatus, such as that disclosed in U.S. Pat. No. 6,192,165, users of the present invention will be able to deploy a comprehensive system to manage both paper-based documents and the corresponding digital images of the paper-based documents in a digital filing operation. In this context, digital filing refers to the efficient management of paper-based information from its receipt at the desktop through an indexing, scanning, image storage and retrieval process, for both the paper-based document and the digital image of the paper-based document. The preferred embodiments of the present invention provide for easy and effective indexing, imaging, storing, retrieving and managing of paper-based documents, transforming them into electronic documents, and then tracking and selectively retrieving either or both the paper-based document and/or a digital image of the paper-based document, based on the information captured prior to the imaging operation. The user may create a single entry in a digital filing system that will provide an electronic link to the digital image of the paper-based document and, simultaneously, information regarding the physical location of the paper-based document in a paper repository allowing for quick and easy retrieval of the paper-based document and/or the digital images of the paper-based documents.

20 Claims, 6 Drawing Sheets

U.S. PATENT DOCUMENTS

| | | | |
|---|---|---|---|
| 5,237,156 A | 8/1993 | Konishi et al. | 235/375 |
| 5,262,804 A | 11/1993 | Petigrew et al. | 347/109 |
| 5,313,572 A | 5/1994 | Yamamoto et al. | 358/403 |
| 5,321,436 A | 6/1994 | Herbert | 347/19 |
| 5,339,412 A | 8/1994 | Fueki | 707/104.1 |
| 5,393,962 A | 2/1995 | Konishi et al. | 235/375 |
| 5,430,276 A | 7/1995 | Ohtani et al. | 235/375 |
| 5,448,375 A | 9/1995 | Cooper et al. | 358/403 |
| 5,451,760 A | 9/1995 | Renvall | 235/375 |
| 5,452,379 A | 9/1995 | Poor | 382/317 |
| 5,479,588 A | 12/1995 | Sawada et al. | 385/1.18 |
| 5,496,117 A | 3/1996 | Sawada et al. | 400/61 |
| 5,557,091 A | 9/1996 | Krummel | 235/462.08 |
| 6,013,154 A * | 1/2000 | Thomas-Cote | 156/230 |
| 6,192,165 B1 | 2/2001 | Irons | 382/306 |
| 6,236,767 B1 * | 5/2001 | Altman | 358/407 |

* cited by examiner

APPARATUS AND METHOD FOR SIMULTANEOUSLY MANAGING PAPER-BASED DOCUMENTS AND DIGITAL IMAGES OF THE SAME

RELATED APPLICATION

This application is a continuation in part of U.S. patent application Ser. No. 09/436,130, filed Nov. 8, 1999, now issued as U.S. Pat. No. 6,427,032, which is a continuation in part of U.S. patent application Ser. No. 09/001,228, filed Dec. 30, 1997, now issued as U.S. Pat. No. 6,192,165, which applications are incorporated herein by reference.

BACKGROUND OF THE INVENTION

1. Technical Field

This invention generally relates to document management and more specifically relates to a system and method for indexing, imaging, storing, and retrieving images of paper-based documents while simultaneously facilitating management and retrieval of the original paper-based documents from which those images were created.

2. Background Art

While most modern computer systems can be used for business, education and entertainment purposes, the most widespread application for computers today is related to processing information. Word processing, page layout, database, spreadsheet, and desktop publishing applications are used to prepare and disseminate information throughout society. The increased availability of computer systems and computer networks such as the Internet have made vast repositories of information available to a huge segment of our population. Indeed, as it has been widely discussed in the popular media, modern computer systems have brought our world into the "information age."

One of the promises of the information age ushered in by these omnipresent computer systems was the advent of a "paperless" society. Computers, in theory, would liberate the world from the flood of paper which currently impedes the flow and management of information. Computer-based systems with advanced information processing capabilities would supposedly allow the instantaneous electronic exchange of information from one location to another, without the necessity of "hard copy." Indeed, many businesses have embraced computer systems with the stated goal of eliminating, or at least significantly reducing, the seemingly endless stream of paper that flows into and out of an office. Reducing the burdens of paper-based information has become a widespread goal. However, the simple truth is that today we have more paper-based information, document processing labor costs, document storage overhead, and hard-copy related dependencies in our society than ever before.

In fact, the dream of a paperless society remains a faint gleam in the tired eyes of today's information workers. Reams and reams of paper continue to pile up on desktops and fill filing cabinets to overflowing in offices all over the world. If anything, the increased number of computers have exacerbated the rapidly increasing flow of paper in our society. In making information systems available to the masses, computers have allowed more and more people to generate ever growing quantities of paper which, in order to be useful, must be read and processed by someone, somewhere.

It is estimated that businesses worldwide generate more than 2 trillion pages of documents annually. In addition, in spite of the rapid proliferation of computer systems and computer users, it is estimated that less than 25% of the information used in the world today is available in a computer-accessible format. The average office worker spends 10%–40% of their time looking for information, much of it paper-based. And for every $1 spent producing a paper document, $10 dollar is spent to process and store that document. The very paperwork that drives most businesses and organizations is slowly starting to choke the productivity out of some of them as these businesses are unable to effectively and efficiently manage paper-based information.

Recognizing this problem, attempts have been made to better manage and control the paperwork that flows into the information stream each and every day. Some of these previously implemented solutions are based around the notion of creating, storing, and accessing electronic images directly in a computer system, bypassing hard copy completely. This solution makes sense only when a company or organization achieves fairly tight control over the generation and use of documents and can, therefore, effectively reduce the paper flow in certain situations. However, much of the paper burden in a given organization is directly attributable to paper-based documents that are generated by external sources. This means that most businesses and organizations, regardless of their internal systems, still receive and process paper-based information.

One answer to the problems associated with management of the vast quantities of paper-based documents generated by businesses today is the continued growth and adoption of "out-sourced" filing operations. These outsourcing companies will periodically travel to a customer's facility and retrieve their paper-based documents for off-site storage. The paper is boxed and marked for future retrieval, if desired, then stored off-site in large, centrally-located warehousing facilities. The outsourcing company may provide additional services such as indexing and "on-demand" retrieval of certain documents, all on a "fee-for-service" basis. Unfortunately, even if a company adopts an out-sourced model for storing their physical paper, this merely pushes the storage issue off to another physical location. In addition, the costs associated with retrieval of physical documents stored at an off-site facility can be very high. This is because the retrieval process is a labor-intensive manual process that involves people scouring through boxes of paper stored in massive warehouses. Finally, there is no simple, integrated methodology to track the paper throughout its life cycle since the outsourcing company can't quickly and easily retrieve a given document or page of a document. However, even with the high cost and relative inefficiencies associated with these labor intensive paper storage and management solutions, they are very prevalent in the industry today simply because they do offer a solution.

Other known solutions include document imaging systems which can scan paper-based documents and store/retrieve the resulting electronic images. Though many different document imaging systems have been commercialized since the late 1980s, none have gained widespread acceptance. Even though the quantifiable burdens of paper information storage, access and management are well known and uniformly decried, document imaging systems have not been broadly adopted as an alternative to the traditional filing cabinet. Document imaging systems today capture less than 1% of paper filing volumes. File cabinets continue to fill up, desktop stacks of paper continue to grow, and many business processes and desktops are still paper-bound. International Data Corporation (IDC) estimates that in 1997, U.S. business spent $25–35 billion on filing, storing and retrieving paper. This number approaches $100 billion when the total life cycle paper management costs are calculated, according to IDC.

A key reason for continued preference of paper-based document management over electronic document imaging systems, in spite of the problems and costs associated with the use of paper, stems from a fundamental impediment to the wide-scale adoption of imaging technology in the workplace. Basically, the lack of an efficient, cost-effective, adaptable method for driving paper through the scan and index process continues to thwart the efforts of most organizations that try to adopt wide-reaching document imaging solutions. The lack of simple, office automation platforms for image capture and indexing remains a key barrier to broadened use of document imaging.

Document capture (scanning and indexing) sub-systems are usually the most costly, labor-intensive, time-consuming, and error prone component of a traditional document imaging solution. To be effective, a paper-to-digital conversion system must address, at a minimum, the following activities: document aggregation; document preparation for scanning; document batching; document scanning; scanning quality controls; pre-committal image caching; document indexing; database updates; and permanent image storage. Traditional document imaging systems build an input assembly line of process workers, hardware, software, and related network activities to accomplish these tasks. They require network caching and transmission of in-process images, indexing stations with large viewing monitors to assist keystroking from the screen, and human and machine controls for the overall process of document input. The costly, integrated systems developed for these requirements generally institute a rigid process for a targeted, high-volume, structured paper flow. Because customized document input sub-systems are justified and built for targeted business applications, they do not adapt well to other, diversified document imaging needs, smaller workgroup filing systems, or ad hoc filing systems. Unfortunately, diverse, smaller workgroup filing, and ad hoc filing systems represent the bulk of paper filing. The paradigm of a document input assembly line does not match up well with many existing paper movement and filing patterns found in most businesses and organizations.

For example, most traditional document imaging systems operate a centralized input facility with dedicated scanning and indexing equipment and personnel. In this scenario, paper-based documents are funneled to the "imaging" department where document imaging workers identify, batch, organize, prepare, scan and index the documents. While this system is effective for imaging a high volume, structured paper flow, it is counter-intuitive to the natural flow and use of documents in most offices, and therefore, is not applicable. Most office workers receive a paper-based document at their desk and want to use it, then file it so that they or their co-workers can quickly retrieve the document when necessary. The original user of a document is usually the most qualified person to index it. Centralized control and disposition of documents abstracts the office worker from the source of their information and isolates the two entities.

Further, many of these traditional document imaging systems also require the acquisition of expensive new equipment and the training of new workers simply to manage and process the in-coming paper-based documents. This requirement adds a cost barrier to adoption that many organizations cannot overcome. In addition, many of the presently available document imaging systems employ proprietary software for creating, storing, and using document images. By design, these systems limit the availability of the electronic images to the audience within the proprietary document imaging system and thereby reduce the probability of document exchange with other systems and external organizations that may require access to a given document.

The challenges of adopting and implementing paper-to-digital image solutions are not limited to the mechanics and technologies of the document image capture process. Traditional document imaging technologies also introduce significant changes to the user's desktop and to the overall flow of documents in the business process. As previously mentioned, in most large scale document imaging environments, the end user is alienated from the entire imaging/indexing process and does not control the flow or disposition of their own documents. For a paper-to-digital document solution to be truly useful, the end user must be comfortable with the process and must embrace the new methods. User adoption factors are crucial because while the burdens associated with handling paper are ingrained and often accepted, the changes involved in adopting and implementing document imaging systems are wide-reaching and potentially disruptive.

Once these issues surrounding the implementation of a digital imaging solution have been successfully addressed, an acceptable solution can be developed and adopted. However, without a better system and method for overcoming the significant limitations of the present document indexing, imaging, storage, retrieval, and handling systems, the world will be increasingly dependent on antiquated solutions and the associate declines in productivity. Further, even with the best of the currently available digital imaging solutions, the original paper-based documents must still be handled, stored, and either retained or destroyed, depending on the long-term value of the paper-based documents and the specific retention policies related to the paper-based documents. Therefore, even after a digital imaging solution has been adopted, the problems mentioned above related to the ultimate disposition of the paper-based documents remains and the company is left with two separate, monolithic solutions that are used to handle the same information.

In addition, with the ever-increasing volume of paper being generated and managed by businesses in the world today, it is more desirable than ever to have some type of unified system for managing both the paper-based documents and the digital images created from those paper-based documents. Instead of having two disparate systems which each require unique and independent methods for retrieving either the physical paper-based documents or the digital images of the paper-based documents, there will continue to be unnecessary complication and redundancy between the systems.

DISCLOSURE OF INVENTION

According to the preferred embodiments of the present invention, an apparatus and method for simultaneously managing paper-based documents and digital images of the same are disclosed. When used in conjunction with a digital filing apparatus, such as that disclosed in U.S. Pat. No. 6,192,165, users of the present invention will be able to deploy a comprehensive system to manage both paper-based documents and the corresponding digital images of the paper-based documents in a digital filing operation. In this context, digital filing refers to the efficient management of paper-based information from its receipt at the desktop through an indexing, scanning, image storage and retrieval process, for both the paper-based document and the digital image of the paper-based document.

The preferred embodiments of the present invention provide for easy and effective indexing, imaging, storing, retrieving and managing of paper-based documents, transforming them into electronic documents, and then tracking and selectively retrieving either or both the paper-based document and/or a digital image of the paper-based document, based on the information captured prior to the imaging operation. The present invention allows users to index and label documents prior to scanning/imaging and then use standard imaging equipment to create digital images of the paper-based documents. Each paper-based document will be assigned a globally unique identifier and, if desired, other relevant document-specific or user-specific information, such as physical location of the paper-based document. The globally unique identifier is preferably preprinted on an adhesive backed label or printed directly on the leading page of the paper-based document.

This will allow a user to create a single entry in a digital filing system that will provide an electronic link to the digital image of the paper-based document and, simultaneously, information regarding the physical location of the paper-based document in a paper repository allowing for quick and easy retrieval of the paper-based document and/or the digital images of the paper-based documents.

BRIEF DESCRIPTION OF DRAWINGS

The preferred embodiments of the present invention will hereinafter be described in conjunction with the appended drawings, wherein like designations denote like elements, and.

BEST MODE FOR CARRYING OUT THE INVENTION

Figure 1:
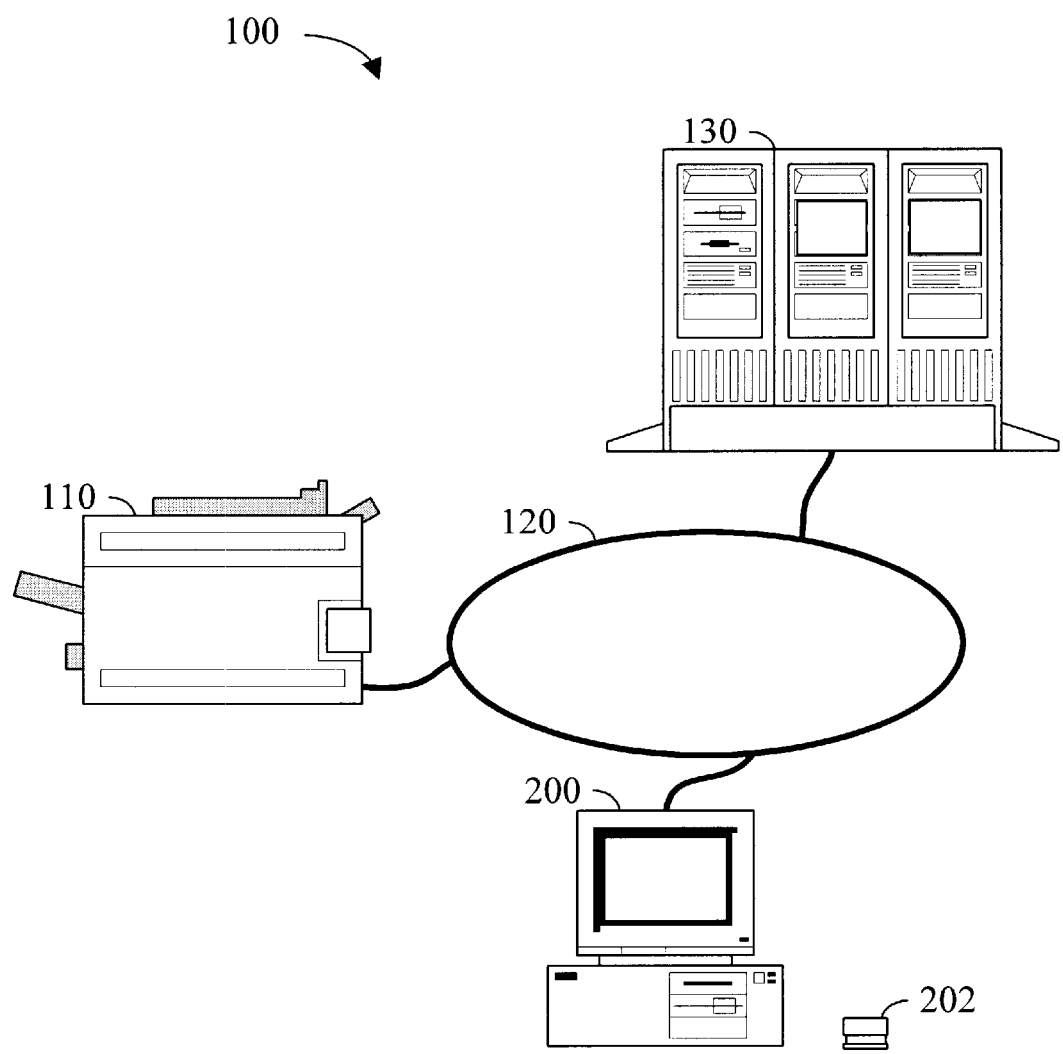
FIG. 1 is a block diagram of a digital filing apparatus for indexing, imaging, storing and retrieving documents according to a preferred embodiment of the present invention.

The present invention provides a simple and efficient way to physically store and retrieve paper-based documents and simultaneously manage the digital images of the paper-based documents in a digital filing system using a single globally unique identifier. By using the preferred embodiments of the present invention, a comprehensive system of storing, managing, and retrieving paper-based documents and the digital images of the paper-based documents can be realized.

Detailed Description

The system and methods of the present invention provide a complete solution for indexing documents, imaging/scanning paper-based documents, storing, and retrieving paper-based documents while simultaneously enabling the storing and retrieving of digital images of the paper-based documents. By implementing the present invention, a user can quickly and easily manage paper-based documents in any business environment. The digital filing process involves receiving a paper-based document, indexing the document at the user's workstation, affixing a globally unique identifier to the document (by placing a pre-printed label bearing the globally unique identifier on the document or by printing the globally unique identifier directly on the document), imaging/scanning the document to create a digital image of the paper-based document, extracting the globally unique identifier from the digital image of the label, and electronically storing the document using the globally unique identifier extracted from the digital image of the label in conjunction with the user supplied indexing information. This process enables generic document imaging, using common office infrastructure, while adapting to various preferences for paper document disposition.

In addition, by attaching a pre-printed, globally unique identifier to a paper-based document prior to scanning, other significant benefits can be achieved. For example, all paper-based documents can become self-managing during the image processing cycle from the point of scanning forward. This allows the indexing, scanning, storage, and retrieval processes to be physically and logically isolated. Finally, in the case of pre-printed labels, the nature of the globally unique identifier allows the labels to be attached to different types of documents without any predetermined relationship between the document, the document's content, and the pre-printed label.

In addition to the benefits relative to using the globally unique identifier to manage the digital images of the paper-based documents, there is a tremendous advantage to be gained by using the same globally unique identifier to manage the physical paper as well. By carefully indexing the physical location of the paper-based document using the same globally unique identifier, the physical location of the paper-based document and the digital image of the paper-based document can be managed simultaneously. In addition, since the physical location of the paper-based documents can be updated as necessary by using the document information stored in image index database 128, the globally unique identifier can be used to retrieve the digital image of the paper-based document and/or retrieve the associated physical paper.

Referring now to FIG. 1, a digital filing system 100 according to a preferred embodiment of the present invention includes: a computer 200; a desktop label dispenser 202; an optional folding out basket 203; a document input mechanism 110; an image storage mechanism 130; and a communication link 120. Taken together, digital filing system 100 provides a way for office workers to index, store, and manage paper-based documents, regardless of their origin.

Desktop label dispenser 202 is a specialized device which is capable of dispensing pre-printed labels that will typically include a computer readable globally unique identifier and/ or bar code along with corresponding human-readable information (i.e., eye-legible content). The globally unique identifiers, which in the most preferred embodiment are pre-printed on labels contained in desktop label dispenser 202, may be implemented as bar codes that conform to some industry accepted bar code standard such as interleaved 2 of 5, code 39, code 138, PDF 417, or other high-density symbology. Alternatively, proprietary or customized bar code symbologies may be employed in order to further distinguish the pre-printed labels and to enhance the security of the labels. Preferred embodiments of representative labels are further described in conjunction with FIGS. 3, 3*a*3*b*, 3*c*, and 3*d* below.

Document input mechanism 110 is any type of device which is capable of scanning or imaging a document. For paper-based documents, flatbed scanners, drum scanners, digital copiers, fax machines, multi-function copiers ("mopiers"), etc. are all examples of document input mechanisms 110 which can be used in various embodiments of the present invention. The purpose of document input mechanism 110 is to scan/image a paper-based document and create a computer file that contains a digital image of a paper-based document. This file is then stored on image storage mechanism 130. In addition, digital transmission of e-mail, faxes etc. may also be considered to be various forms of document input mechanism 110. If the document is already a digital image, then there is no need to scan the document, and the image can be stored according to the method described in FIGS. 7, 7*a*, or 7*b* below.

Image storage mechanism 130 represents large scale secondary storage for storing images which are scanned/ imaged by document input mechanism 110. Various components such as hard disk drives, recordable CD-ROM/DVD drives and jukeboxes, magnetic tapes, and other devices known to those skilled in the art may be used to implement image storage mechanism 130. Digital document images captured by document input mechanism 110 may be transmitted to image storage mechanism 130 via communication link 120. Digital document images stored on image storage mechanism 130 may be transmitted to computer 200 via communication link 120. Image storage mechanism 130 may contain removable, transportable, image storage media, such as magneto-optical media, a DVD disk, or a CD-ROM disk.

Communication link 120 is any suitable computer communication link or communication mechanism, including a hardwired connection, an internal or external bus, a connection for telephone access via a modem or high-speed T1 line, infrared or other wireless communications, computer network communications over the Internet or an internal network (e.g. "intranet") via a wired or wireless connection, or any other suitable connection between computers and computer components, whether currently known or developed in the future. It should be noted that portions of communication link 120 may be a dial-up phone connection, broadcast cable transmission line, Digital Subscriber Line, ISDN line, or similar public utility-like access media. Computer 200 is further described in conjunction with FIG. 2 below.

In operation, a paper-based document is received by a user of system 100. The user will use system 100 to index the document. Indexing a document is the process of assigning "meta-data," thereby describing the document and/or the contents of the document, and using the computer to capture the meta-data. The meta-data, or indexing information, is stored in a record in an image index database at the time of indexing. System 100 generates or coordinates a globally unique identifier for the paper-based document at the point of indexing. Since system 100 tracks each unique globally unique identifier, it can sequence through a series of pre-programmed globally unique identifiers in a pre-programmed fashion. This sequence will match the sequence of the pre-printed labels exactly. Thus, the user can place a label containing the globally unique identifier from label dispenser 202 onto the paper-based document. Since system 100 is tracking the globally unique identifiers, the globally unique identifier on the label can be matched to the next sequential globally unique identifier available in system 100.

Since the two globally unique identifiers match, the globally unique identifier is used to effectively link the document image to the record in the database, facilitating later retrieval of the document image, typically via the indexes. It should be noted that the most preferred embodiments of the present invention would include physical location of the paper-based document as one of the indices used in indexing the paper-based document. This will allow for later retrieval of the paper-based documents via the globally unique identifier. In an alternative preferred embodiment of the present invention, computer 200 communicates with a desktop label printer which generates a label for the paper-based document that contains the globally unique identifier and any other descriptive information used to identify the document (this could include, for example, meta-data such as document title, author, date, or physical storage location of the paper-based document), or uses a desktop labeling mechanism to print the globally unique identifier directly onto the document. In any case, the software associated with system 100 provides the capability to "auto-increment" the globally unique identifier, automatically creating or synchronizing the next identifier with the next identifier printed on the pre-printed labels.

After the globally unique identifier has been applied to the first page of the paper-based document, the document may be stored in folding out basket 203 until the document is ready to be introduced into system 100 using document input mechanism 110. In some preferred embodiments of the present invention, instead of placing a globally unique document identifier on the first page only, a separate identifier may be placed on each page of a paper-based document prior to scanning. When the paper-based document is subsequently scanned, an image of the paper-based document (including the globally unique identifier) is created and the previously-determined globally unique identifier is extracted. After imaging/scanning, the image of the paper-based document is stored in an image repository in a default storage location, such as on image storage mechanism 130, using the previously generated globally unique identifier as the basis for the image file name for the image, thereby linking the document image to a record in an image index database. In some embodiments of the present invention, the globally unique identifier will be the file name or will form the basis for creating the file name used in naming the digital image of the paper-based document, thereby linking the paper-based document and the subsequently created digital image of the paper-based document.

Communication link 120 provides for communication between the various components of system 100 and allows the document image to be transmitted from device to device. In this fashion, a user can quickly and easily gain access to the electronic images of paper-based documents. Examples of communication link 120 include a Local Area Network (LAN), an Intranet, or the Internet. The connection made by communication link 120 may also be wireless. Communication link 120 logically links the physical components of system 100 together, regardless of their physical proximity. This is especially important because in many preferred embodiments of the present invention, it is anticipated that computer 200, document input mechanism 110, and image storage mechanism 130 may be geographically remote and that the indexing process, scanning/imaging process, and storage process will occur in sequential order but will be operationally independent. By labeling the document prior to scanning, and by pre-establishing the image identifier and including the identifier in the label, this method removes the need for any other communication or direct connectivity between the index, scan, and storage processes.

The image of the paper-based document carries embedded within it the image of the globally unique identifier and, correspondingly, the information necessary to link the index, scan, and storage processes, when and as necessary. In addition, by associating or assigning a given group of pre-printed labels containing unique globally unique identifiers to an individual or group of individuals, greater security measures can be afforded to the digital images of the paper-based documents, once the paper-based documents are scanned. By examining the globally unique identifier extracted from the digital image, "ownership" of the digital image can be established without further human intervention. Access to the digital images can then be controlled, as desired.

While designed primarily to deal with incoming paper-based documents, as mentioned earlier, it is also contemplated that incoming electronic documents (e-mail, documents downloaded from the Internet, etc.) could also be indexed and stored using system 100. In the case of electronic documents, the scanning/imaging of the document would not be necessary. In the case of electronic documents, the label containing the globally unique identifier could be printed directly onto the lead page of a document. Then, when the document is subsequently scanned, the globally unique identifier can be used to link the image of the document to a database containing the metadata for the document image. This is especially useful in situation such as delivery receipts, where an invoice is generated by a company, sent out for delivery, signed at the point of delivery and then returned to the point of origin for proof of delivery.

Figure 2:
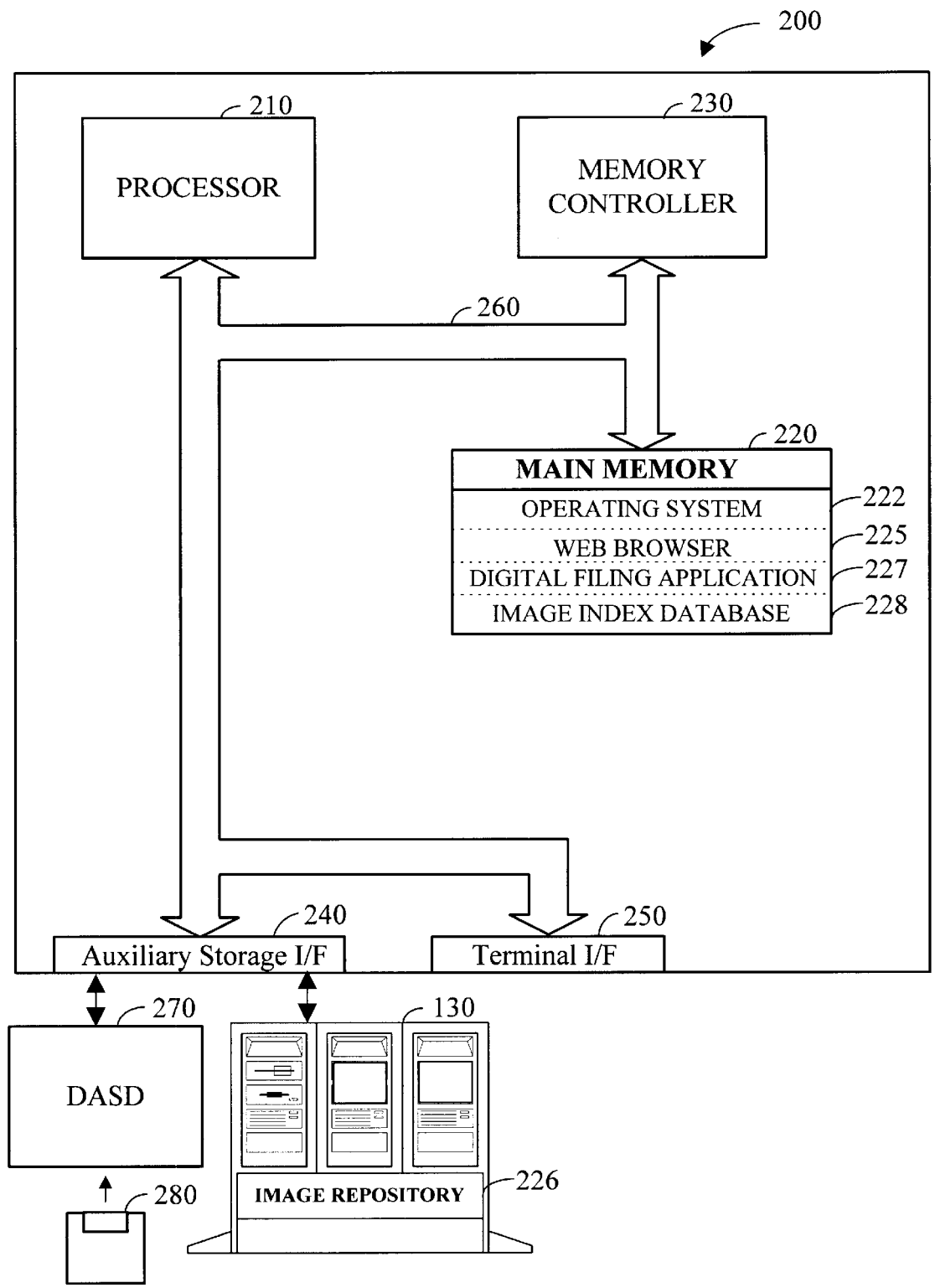
FIG. 2 is a block diagram of a computer system suitable for use with the apparatus of FIG. 1.

Referring now to FIG. 2, a computer 200 in accordance with a preferred embodiment of the present invention is an IBM compatible personal computer system. However, those skilled in the art will appreciate that the methods and apparatus of the present invention apply equally to any computer system, regardless of whether the computer system is a complicated multi-user computing apparatus or a single user device such as a personal computer or workstation. Specifically, it is envisioned that a hand-held computer or palm computing device may perform all or substantially all of the functions described in conjunction with computer 200.

Computer 200 suitably comprises at least one Central Processing Unit (CPU) or processor 210, a main memory 220, a memory controller 230, an auxiliary storage interface 240, and a terminal interface 250, all of which are interconnected via a system bus 260. Note that various modifications, additions, or deletions may be made to computer system 200 illustrated in FIG. 2 within the scope of the present invention such as the addition of cache memory or other peripheral devices. For example, computer 200 will also include a monitor or other display device (not shown) connected to the system bus 260. Alternatively, it is anticipated that computer 200 may be a terminal without a CPU that is connected to a network as a network computer (NC). In that case, the responsibilities and functions of CPU 210 will be assumed and performed by some other device on the network. FIG. 2 is not an exhaustive illustration of any specific computer system or configuration, but is presented to simply illustrate some of the salient features of one preferred embodiment for computer system 200.

Processor 210 performs computation and control functions of computer 200, and may comprise a single integrated circuit, such as a microprocessor, or may comprise any suitable number of integrated circuit devices and/or circuit boards working in cooperation to accomplish the functions of a processor. Processor 210 typically executes and operates under the control of an operating system 222 within main memory 220.

Auxiliary storage interface 240 allows computer 200 to store and retrieve information from auxiliary storage devices, such as image storage mechanism 130, magnetic disk drives (e.g., hard disks or floppy diskettes) or optical storage devices (e.g., CD-ROM). One suitable storage device is a direct access storage device (DASD) 270. As shown in FIG. 2, DASD 270 may be a floppy disk drive which may read programs and data from a floppy disk 280. It is important to note that while the present invention has been (and will continue to be) described in the context of a fully functional computer system, those skilled in the art will appreciate that the various mechanisms of the present invention are capable of being distributed as a program product in a variety of forms, such as via recordable media or transmission media and that the present invention applies equally regardless of the particular type or location of signal bearing media used to actually carry out the distribution. Examples of signal bearing media include: recordable type media such as floppy disks (e.g., disk 280) and CD ROMS, and transmission type media such as digital and analog communication links, including wireless communication links.

Memory controller 230, through use of a processor (not shown) separate from processor 210, is responsible for moving requested information from main memory 220 and/or through auxiliary storage interface 240 to processor 210. While for the purposes of explanation, memory controller 230 is shown as a separate entity, those skilled in the art understand that, in practice, portions of the function provided by memory controller 230 may actually reside in the circuitry associated with processor 210, main memory 220, and/or auxiliary storage interface 240.

Terminal interface 250 allows system administrators and computer programmers to communicate with computer system 200, normally through programmable workstations. Although computer 200 depicted in FIG. 2 contains only a single main processor 210 and a single system bus 260, it should be understood that the present invention applies equally to computer systems having multiple processors and multiple system buses. Similarly, although the system bus 260 of the preferred embodiment is a typical hardwired, multi-drop bus, any connection means that supports bi-directional communication in a computer-related environment could be used.

Main memory 220 suitably contains an operating system 222, a web browser 225, a digital filing application 227; and an image index database 228. The term "memory" as used herein refers to any storage location in the virtual memory space of computer 200. It should be understood that main memory 220 will not necessarily contain all parts of all mechanisms shown. For example, portions of operating system 222 may be loaded into an instruction cache (not shown) for processor 210 to execute, while other files may well be stored on magnetic or optical disk storage devices (not shown). In addition, although image index database 228 is shown to reside in the same memory location as operating system 222, it is to be understood that main memory 220 may consist of multiple disparate memory locations.

Operating system 222 includes the software which is used to operate and control computer 200. Operating system 222 is typically executed by processor 210. Operating system 222 may be a single program or, alternatively, a collection of multiple programs which act in concert to perform the functions of any typical operating system, which functions are well known to those skilled in the art.

Web browser 225 can be any web browser software application currently known or later developed. Examples of suitable web browsers 225 include Microsoft Internet Explorer and Netscape Navigator. It is anticipated the other vendors will develop web browsers that will be suitable for use with the various preferred embodiments of the present invention.

Image repository 226 can be any type of computer filing or storage structure known to those skilled in the art. In the most preferred embodiments of the present invention, image repository 226 is simply a directory or subdirectory or a series of directories or subdirectories containing a series of images where each image has a globally unique identifier, taken from the pre-printed labels or, alternatively, created and assigned as explained below in conjunction with FIGS. 5 and 6. In one preferred embodiment of the present invention, image repository 226 may be a Structured Query Language (SQL) compatible database file capable of storing records containing images. In another preferred embodiment of the present invention, image repository 226 is an image directory on a DVD or CD-ROM disk which can be easily transported from one geographic location to another.

In one preferred embodiment of the present invention, digital filing application 227 works in conjunction with web browser 225 to provide the various functions of the present invention including a user interface and indexing tools used to prepare a document for subsequent scanning/imaging and electronic filing. Alternatively, digital filing application 227 may be a stand-alone program product which does not use web browser 225 for additional functionality and operates over an office intranet, in conjunction with any typical network operating system such as Windows NT or Novell.

Digital filing application 227 also incorporates standard database management tools to provide record management capabilities (add, modify, delete, etc.) for image repository 226 and image index database 228 and various administrative utilities.

Preferably, image index database 228 is a Structured Query Language (SQL) compatible database file capable of storing information, including indexed document names, for the images stored in image repository 226. In addition, image index database 228 may be physically located in a location other than main memory 220. For example, image index database 228 may be stored on an external hard disk drive (not shown) coupled to computer 200 via auxiliary storage I/F 240. Alternatively, image repository 226 and image index database 228 may each be stored at different remote locations which are accessible via the Internet, by utilizing web browser 225.

It should be noted that an image or images from image repository 226 may be loaded into main memory 220 and/or a cache memory storage location (not shown) for viewing by digital filing application 227 and/or web browser 225. As is typical for web browsers, previously viewed images may be recalled by using a "back" or "forward" button. Since the present invention works with standard web browsers, this functionality will be available for images viewed using digital filing application 227. If a web browser is not utilized, any other standard image viewer may be employed. Since the images will be stored using industry standard formats such as portable document format (PDF) or tagged image file format (TIFF), those skilled in the art will recognize that there are many options for viewing images, including readily available system software and viewers that can be downloaded from the internet. In addition, the use of PDF and TIFF is not exhaustive, it is anticipated that various types of image formats may be used in various preferred embodiments of the present invention. The most preferred embodiments of the present invention also use the header of the digital image file to store index information related to the digital image. In this fashion, a complete restoration of image index database 228 can be reconstructed from image repository 226.

Figure 3:
FIG. 3 is a view of a typical label in accordance with a preferred embodiment of the present invention.

Referring now to FIG. 3, a sample label 300 in accordance with a preferred embodiment of the present invention is illustrated. As shown in FIG. 3, label 300 contains two separate portions, an eye-legible information portion 302 and a computer readable bar code portion 304. Eye-legible information portion 302 is provided as a convenience for the user of system 100 and provides basic information about a paper-based document or about how a given paper-based document is to be processed. Computer readable portion 304 is used to link and/or contain, transport, and store the globally unique identifier and meta-data to be used when the scanned image is stored on image storage mechanism 130 of FIG. 1.

While the information contained in these two different portions may be identical, for security reasons the information in these two different portions may be different. It should be noted that the actual use of a typical bar code symbology to encode the globally unique identifier anticipates the use of many different types of symbologies. This includes those symbologies that represent digital information as shading within an icon (2d bar code symbologies) or any other symbology capable of representing large quantities of information in a digital format. In many preferred embodiments, the preprinted globally unique identifier will simply be a globally unique number represented in a traditional bar code symbology such as Interleaved 2 of 5 or code 39. Also note that the bar code or machine readable portion of the label may include additional information, besides the globally unique identifier to be used when storing the digital image of the paper-based document. For example, information on physical location of the paper-based document, document disposition details, or additional index data for the document may also be contained in the bar code.

In addition to providing a globally unique identifier for each document, each label 300 acts as a document separator and each occurrence of a new label 300 will signify the beginning of a new document for digital filing application 227. This feature allows a stack of multiple documents to be scanned in a single operation without the necessity of manually inserting document separator sheets into the stack.

Figure 3A:
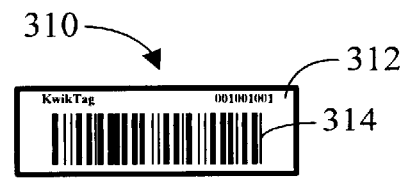
FIG. 3a is a view of a typical label in accordance with an alternative preferred embodiment of the present invention.

Referring now to FIG. 3a, an alternative preferred embodiment of a sample pre-printed label 310, typical of the type of labels used in conjunction with the present invention is shown. As shown in FIG. 3a, typical label 310 also contains two separate portions, an eye-legible information portion 312 and a computer readable bar code portion 314. The difference between label 300 and label 310 is the that the bar code symbology used in label 300 is a 3-dimensional symbology and the bar code symbology used in label 310 is a 2-dimensional symbology.

The most preferred embodiments of pre-printed labels used in conjunction with the present invention utilize the Interleaved 2 of 5 bar code symbology to represent the globally unique identifier for a digital image to be created in the future. When using pre-printed labels, digital filing application 227 is synchronized with the bar-coded numbers on the pre-printed labels. Digital filing application 227 allows a user of system 100 to easily increment or decrement the numbers used as globally unique identifiers to maintain synchronization, in case a user accidentally destroys a label. Since the pre-printed bar-coded numbers on the labels are sequential, once digital filing application 227 has been synchronized with the first pre-printed label, the numeric globally unique identifiers created by digital filing application 227 and numbers on the pre-printed labels advance in lock-step sequence. Once a roll or pad of labels has been expended, a new roll or pad of labels can be loaded and synchronized with digital filing application 227 once again.

Figure 3B:
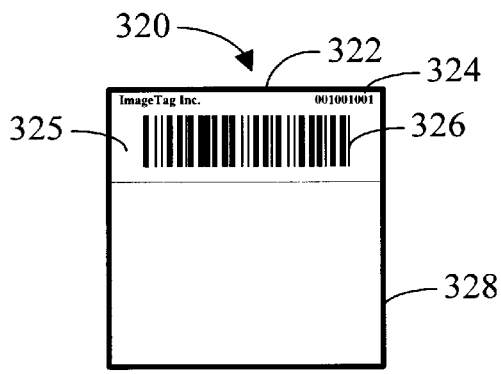
FIG. 3b is a view of a typical label in accordance with an alternative preferred embodiment of the present invention.
Figure 3C:
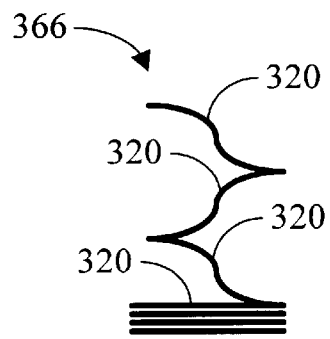
FIG. 3c is a side view of a pad of pre-printed labels in accordance with a preferred embodiment of the present invention.

Referring now to FIG. 3b, a typical pre-printed label 320, dispensed by desktop label dispenser 202 (not shown this FIG.) is shown. Label 320 is typical of a single label dispensed from pad 366, as shown in FIG. 3c. As shown in FIG. 3b, label 320 contains an eye-legible information portion 324 and a computer readable bar code portion 326 printed on an acetate or similar film product 322. Label 320 most preferably comprises an opaque portion 325 and a clear portion 328. Eye-legible information portion 324 and a computer readable bar code portion 326 are printed on opaque portion 325. In the most preferred embodiments of the present invention, the surface of clear portion 328 is suitable for writing upon. This allows the user to make comments regarding the paper-based document to which it is attached.

Referring now to FIG. 3c, pad 366 is composed of a series of individual labels 320. The individual labels 320 are joined together by an adhesive such that they form a fan-fold configuration. When the user pulls a first label 320 from dispenser 360, the next label 320 is pulled into the dispensing position by the force of removing the first label 320, in a pop-up fashion. Similarly, when the second label 320 is pulled from dispenser 360, the third label 320 is pulled into the dispensing position. In this fashion, each of the individual labels 320 in pad 366 can be dispensed one at a time and applied to documents.

Figure 3D:
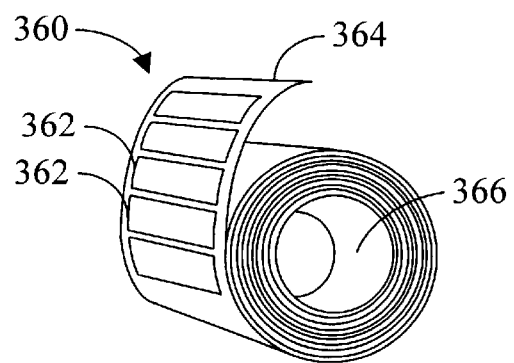
FIG. 3d is a perspective view of a roll of pre-printed labels in accordance with a preferred embodiment of the present invention.

Referring now to FIG. 3d, an alternative preferred embodiment for a roll of individual pre-printed labels 360 is shown. Roll 360 is typical of the type of labels which could be dispensed from a standard label dispenser. Roll 360 comprises a backing liner 364 and a series of individual pre-printed, pre-cut labels 362 wound on an optional core 366. Optional core 366 is used to provide stability for roll 360 during the dispensing operation and may be sized as required. Labels 362 may be printed on any suitable pressure sensitive adhesive backed paper. Labels 362 may utilize a repositionable adhesive or a permanent adhesive, depending on the application requirements.

Figure 4:
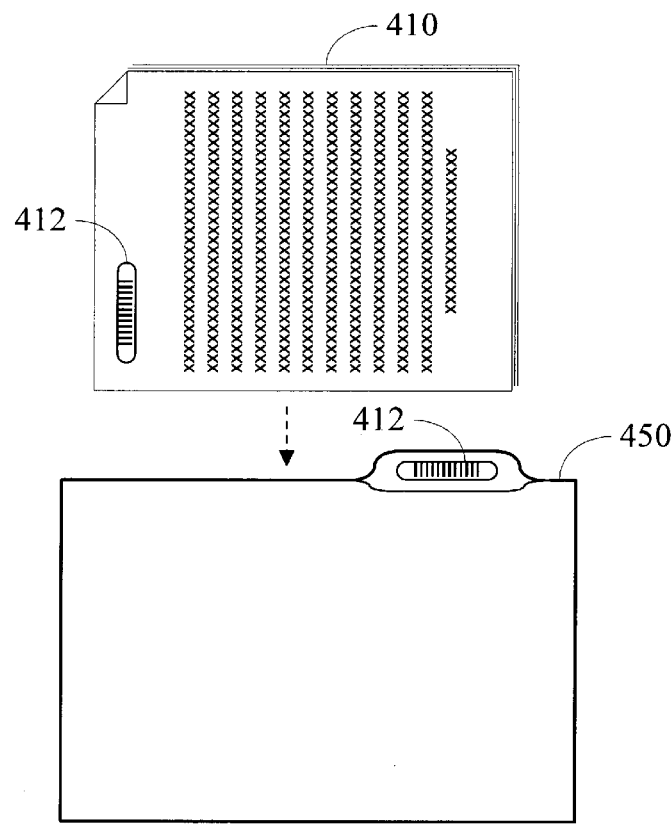
FIG. 4 is a view of a document storage method in accordance with a preferred embodiment of the present invention.

Referring now to FIG. 4, a storage method for managing paper-based documents according to a preferred embodiment of the present invention is illustrated. As shown in FIG. 4, one or more paper-based documents 410 may be placed into a file folder 450. File folders 450 are any type of container that may be used to store documents and may be constructed from materials that are well-known to those skilled in the art. Standard office products such as manilla folders, plastic document holders and the like are all considered as possible embodiments of file folder 450 and suitable for use in conjunction with the present invention.

It should be noted that each separate paper-based document 410 will have a pre-printed label 412 placed on the leading page of each of the paper-based documents 410, where each pre-printed label 412 will display a globally unique identifier as described above in conjunction with FIGS. 3, 3a, 3b, 3c, and 3d. As previously discussed, each document 410 may be one or more pages. In addition, as shown in FIG. 4, each file folder 450 may also be identified with a pre-printed label 412 and, correspondingly, a globally unique identifier that can act as an additional index value for physically locating a paper-based document once it has been placed into an archive location.

Figure 4A:
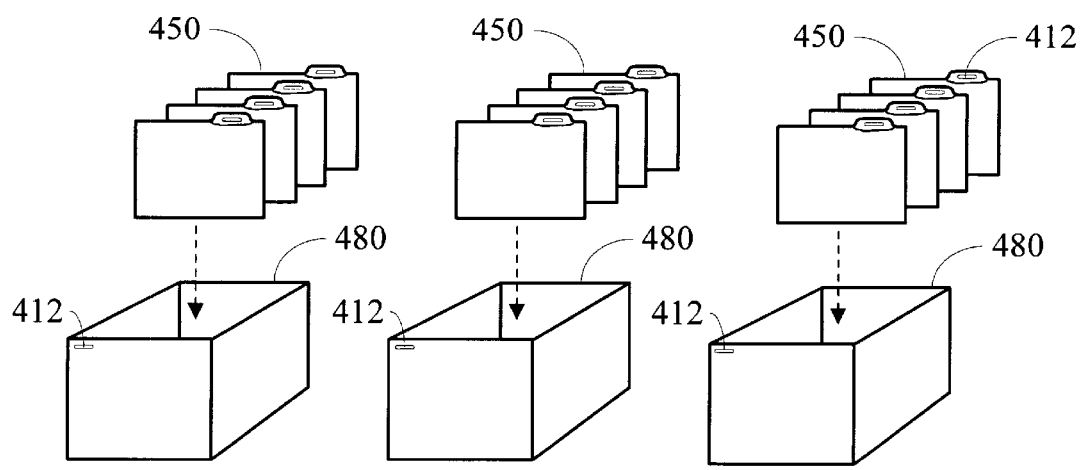
FIG. 4a is a companion view of a document storage method in accordance with a preferred embodiment of the present invention.

Referring now to FIG. 4a, a further extension of the storage method for managing paper-based documents according to a preferred embodiment of the present invention is illustrated. As shown in FIG. 4a, a plurality of file folders 450 may be accumulated and placed into one or more storage containers 480. As with the file folders 450, each of the storage containers 480 may also be identified with a pre-printed label 412 and, correspondingly, a globally unique identifier that can act as an additional index value for physically locating a paper-based document once it has been placed into an archive location. Each storage container 480 is capable of holding one or more file folders 450 and may be constructed from any suitable material known to those skilled in the art. While depicted in FIG. 4a as a standard cardboard box such as a "banker's box," storage container 480 may be any other suitable container for file folders 450, including filing cabinets and the like.

The use of pre-printed labels on file folders 450 and storage containers 480 is especially useful in situations where additional information for speedier retrieval of paper-based documents 410 is desired. The use of pre-printed labels 412 on file folders 450 and storage containers 480 can reduce the amount of time required for retrieval of a given paper-based document 410. Without the use of a pre-printed label 412 on each file folder 450 and each storage container 480, a user would be required to look through each file folder 450 after locating the appropriate storage container 480. In contrast, the use of pre-printed labels 412 on file folders 450 and storage containers 480 would allow a user to quickly locate the desired storage box 480 and then find the desired file folder 450 and desired paper-based document 410 with the maximum amount of efficiency. Since the index information, including the physical location of the paper-based document, is available from digital filing system 100, once the digital image of the paper-based document is retrieved, the information relative to the physical location of a given paper-based document is also known. Alternatively, if the physical location of the paper-based document is ascertained from the globally unique identifiers associated with the paper-based document, the digital image of the paper-based document can also be retrieved.

Figure 5:
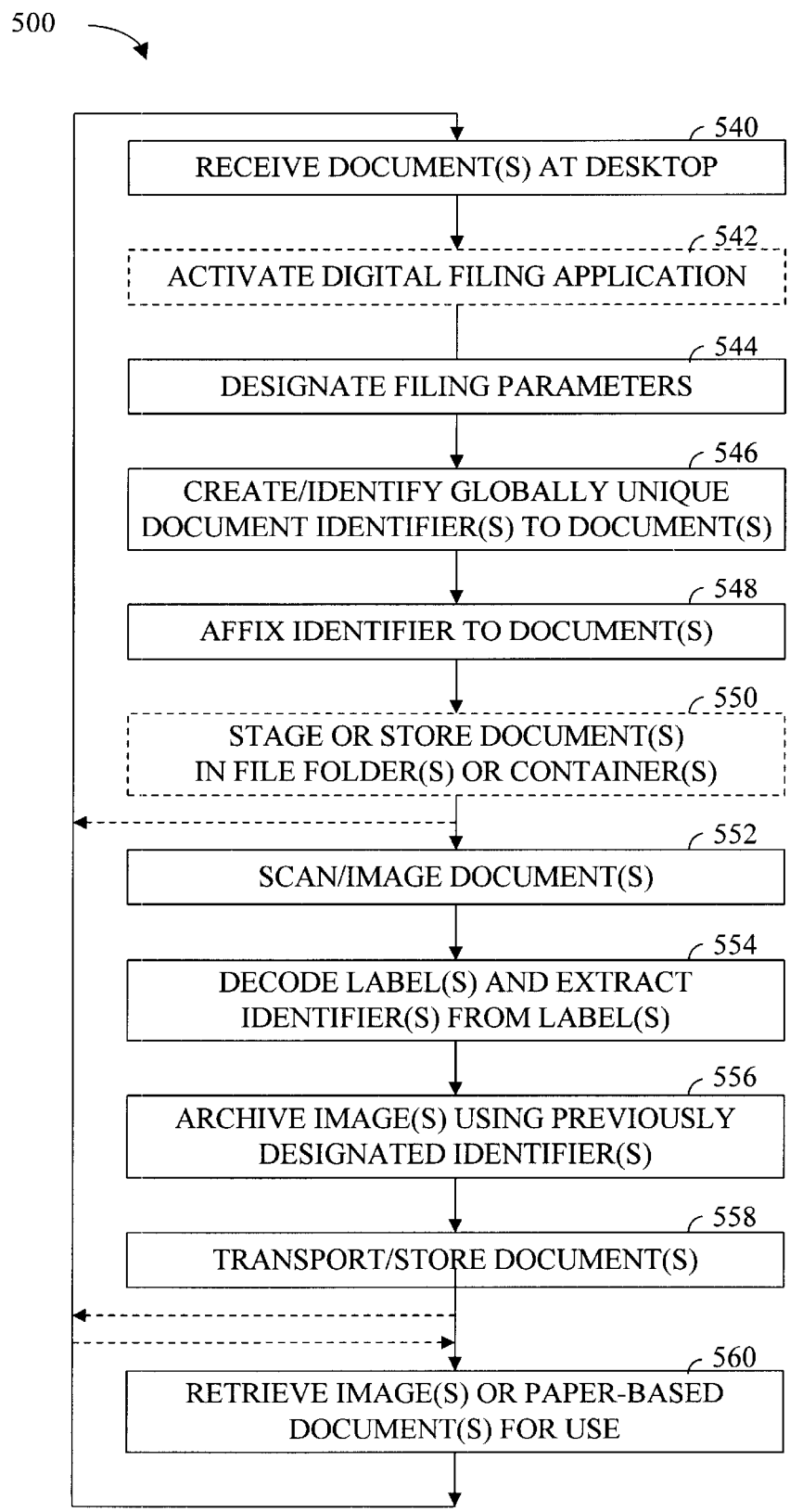
FIG. 5 is a flow chart for managing paper-based documents according to a preferred embodiment of the present invention.

Referring now to FIG. 5, a method 500 for simultaneously managing paper-based documents and digital images of the paper-based documents according to a preferred embodiment of the present invention is illustrated. As shown in FIG. 5, the method begins when a document arrives at a user's desktop (step 540). When the user is ready to index the document, the user will activate digital filing application 227 to index documents (step 542). This step is shown as an optional step because the user may have activated the software prior to the arrival of the document at the desktop and/or the user may choose not to add any additional meta-data. While digital filing application 227 may be a stand-alone software package, in an alternative preferred embodiment, digital filing application 227 is a web browser-based program that, when invoked, automatically launches a web browser such as Microsoft Internet Explorer and works directly with the web browser software to index, label, and retrieve documents. Digital filing application 227 may also be implemented as a JAVA applet or a plug-in for a web browser that is activated from within the web browser.

After activating digital filing application 227, the user can access the user interface and designate the filing parameters, processes, and indices for the document being indexed (step 544). The filing parameters can include the logical location where the digital image should be stored as well as meta-data describing the document to categorize the document contents for later searching and retrieval and describe the physical location where the paper-based document(s) will be warehoused. In the most preferred embodiments of the present invention, the filing parameters will include the globally unique identifier associated with a specific file folder and/or storage container.

In addition, the indexing operation may include the step of indicating processing instructions for the digital image of the paper-based document. These processing instructions may include items such as "e-mail" a document image, or an instruction to export the digital image and the related index information to another software program. These processing instructions are stored in image index database 228 and "suspended" until such time as the paper-based document is scanned. Once the document has been scanned, the unique globally unique identifier is used to locate the correct record in image index database 228 and the appropriate processing instructions can be executed. It should be noted that the physical storage location of image index database 228 and/or image repository 226 may be a local hard drive on the user's computer system, a network storage device at the user's location, or some storage location in a physically and/or geographically different location. Any storage location accessible by system 100 may be used. This is especially important for Intranet and Internet applications. By storing images in a remote location, automatic backup and security features may be easily implemented.

Next, digital filing application 227 will create/identify the globally unique identifier which will eventually be used to create the image file name for the document (step 546) according to the conventions previously illustrated. In the case of pre-printed labels, digital filing application 227 is synchronized with the pre-printed labels and the image file name generated by digital filing application 227 is the next bar-coded number in sequence on the next pre-printed label. In the case of pre-printed labels, the label is retrieved from a desktop label dispenser and applied to the document. In addition to acting as the globally unique identifier for the document, the globally unique identifier is used to create a database record with the filing indices and filing instructions and use the label to match the digital image of the paper-based document with the appropriate filing indices and instructions.

As explained earlier, a label may also be generated by desktop labeling mechanism 202 and subsequently applied to the document by the user or applied directly to the document by desktop labeling mechanism 202. Regardless of how the label is generated for this labeling process, a user tells system 100 how to file the document and the filing instructions are "tagged" onto the document (step 548). Regardless of whether the label is pre-printed or printed on demand, once a document has been tagged or labeled, the document is inventoried and becomes linked to system 100 as an intelligent, self-managing document.

After the document has been indexed and labeled, the document can optionally be stored in a folding out basket, awaiting subsequent scanning/imaging (step 550). However, in the most preferred embodiments of the present invention, each document will be placed in both a file folder and a storage container. This will allow for optimal efficiency in retrieving the paper-based document in the future.

Next, the paper-based document is scanned or imaged using a scanning sub-system (step 552), thereby creating an electronic image of the document. After the scanning process, the label is decoded by the scanning sub-system and the previously created/issued globally unique identifier is extracted from the label (step 554). The process of decoding the label and extracting the globally unique identifier from the label can be accomplished by many different methods. The most preferred embodiments of the present invention uses a method whereby the image of the paper-based document is used to generate a bit mapped image for processing. The bit map is searched for data blocks which are candidates for bar codes. Each of the data blocks are then processed to determine the content of each unique object within the data block. One variation of this specific methodology is described in significant detail in U.S. Pat. No. 5,557,091, which patent is incorporated herein by reference. Those skilled in the art will recognize that there are numerous other, similar methods which may suitably be employed. The actual method used is not as important as the ability of the method to accurately and reliably decode the digital image and extract the globally unique identifier from the digital image of the paper-based document.

Using the instructions associated with the label, the document image is electronically processed and may be archived in a specified location on image storage mechanism 130, using the previously created globally unique identifier (step 556). In addition, the actual stored name may also include an appended file name extension such as .tif or .pdf to identify the type of image that has been stored. The filing indices and the filing instructions for the paper-based document are either contained in the bar code or in a database record that is identified by the globally unique identifier printed on the pre-printed label which is, in turn, attached to a paper-based document. Regardless of how the label is generated, the globally unique identifier printed on the label is used to connect the digital image of the paper-based document to the indices and processing information for the related paper-based document. The globally unique identifier that is extracted from the label may be used as the name of the file directly or, alternatively, used as part of the ultimate file name or, as an index into a database that contains the actual file names.

The next step in the process, if desired, is to transport the physical paper-based documents (step 558) to a storage facility or warehouse for interim storage until such time as the physical paper-based document is required.

Operational rules, color-coded out baskets, eye legible label content or other user-determined methods will determine the disposition of the original paper-based document after scanning (e.g. return in out basket to originator, file centrally, destroy, etc.). After image storage, the digital image of the document can optionally be retrieved (step 560) by the user for review, printing, editing, etc. In addition, the paper-based document can be retrieved (step 560) using a document organization schema, if the paper-based document has been retained. As shown by the dashed arrow lines in FIG. 5, a user can repeat the indexing and labeling process for additional paper-based documents and then batch scan the staged documents all at once. In addition, step 530 can be repeated for as many documents or document images as desired.

To retrieve the digital image, the user will invoke digital filing application 227 separately or in conjunction with web browser 225 and employ the user interface to select the desired digital image. Digital filing application 227 references image index database 228 and uses the unique identifier previously created for the desired document image to locate the document image in image repository 226. If necessary, digital filing application 227 and/or web browser 225 will use the file name extension (.tif or .pdf, for example) of the image to identify the software support necessary to display the image. The software support for image display, faxing, printing, integration, etc. can be provided directly by digital filing application 227 or web browser 225 or, alternatively by web browser 225 invoking other, supporting $3^{rd}$ party application software programs as necessary. As suggested by the arrows in FIG. 5, this process can be repeated for each and every document that the user receives, if desired.

To retrieve the physical paper-based document, a user will invoke digital filing application 227 separately or in conjunction with web browser 225 and employ the user interface to select the desired digital image. As described above, digital filing application 227 will retrieve the index data for the desired document image index database 228. This information will include the necessary information regarding the physical location of the paper-based document to allow the user to retrieve the paper-based document. For example, the index information will include the unique identifier for the file folder and the unique identifier for the storage container that will allow the user to locate the exact storage container and the exact file folder within the storage container where the desired paper-based document may be located.

A system setup allows the user to specify the default location for image repository 226 such as a main system secondary storage location, a centralized storage location, or a third party storage location. In addition, when system 100 is initially installed, the system parameters can be set to work with images in any standard image file format, such as TIFF or PDF. Additionally, the scanning/imaging software can be configured to output any standard image file format and to use a default scan mode, such as TIFF. Although system 100 is originally configured with various defaults, the user can override the defaults and optionally select a different image format for scanning/imaging documents and/or storing document images. If desired, system 100 will automatically write an appropriate file name extension according to the image file format selected by the user, or the default file format where no override is exercised by the user.

It should also be noted that step 558 may occur prior to step 552. This would indicate that the paper-based documents will be scanned at a location other than the location where the documents were indexed. In addition, step 558 may also occur in both places, i.e., the paper-based documents may be transported from a first location where they were indexed to a second location where they were scanned and then to a third location where they were stored.

Figure 6:
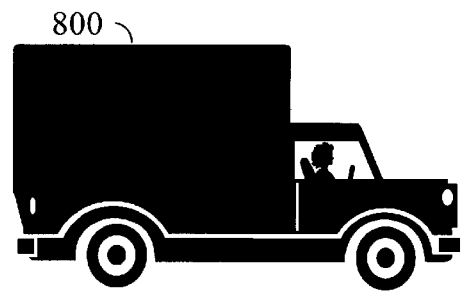
FIG. 6 is a flow chart for managing digital images of paper-based documents according to a preferred embodiment of the present invention.
Figure 7:
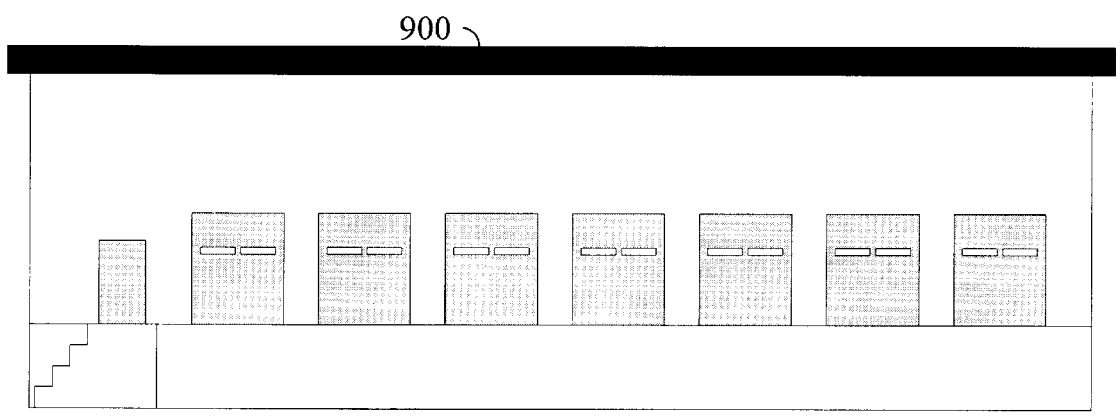
FIG. 7 is a flow chart for simultaneously managing paper-based documents and digital images of the paper-based documents in accordance with a preferred embodiment of the present invention.

Referring now to FIGS. 6 and 7, the storage containers containing the file folders, which in turn contain the paper-based documents, may be transported by vehicle 800 to a storage facility 900. Vehicle 800 may be any type or mode of transportation which can be utilized to transport storage containers from the indexing and/or the scanning location to storage facility 900. Storage facility 900 may be any type of building or facility which can be or which has been adapted for the storage of paper-based documents.

It should be noted that several significant departures from traditional document image processing systems have been adopted in the methods of the present invention. According to several of the most preferred embodiments of the present invention, paper-based documents are indexed on demand, then physically labeled with a link (using a globally unique identifier) to their index, prior to scanning. At least a portion of the label contains a computer or machine-readable image filename, used by digital filing application 227 and residing in image index database 228. The globally unique identifier printed on the label is used by document input mechanism 110 to identify and relate to or to name the digital image of the paper-based document when it writes the document image to image repository 226, and to relate the image to the metadata stored in image index database 228, thereby completing the input process. This eliminates the need for the extensive hardware, software, network integration, and system and user process which is necessary when indexing occurs after scanning. For example, image indexing stations with large viewing monitors, network and local image caching and cache management, image input process staging, scan-index work scheduling, image indexing work, and update-write-commit activity are not needed with the preferred embodiments of the present invention.

The present invention, by pre-defining the globally unique identifier and using it as the link between image index database 228 and the document images contained in document image repository 226, eliminates the need for a post-scan process to either update image index database 228 with an image storage location pointer, or to establish an intermediate lookup table for that purpose. Using the pre-printed globally unique identifier to represent or relate to the final image file name and use the bar code to transport that file name/identifier with the related paper-based document is different from conventional document bar coding strategies that use bar-coded data solely to point to a database record housing additional, related index information. These methods or the present invention, part of the unique strategy of indexing documents prior to scanning, make it possible to implement a generic document imaging solution, i.e. "digital filing."

This process also allows the user to initiate control at the point of document receipt, i.e. the user's desktop. In addition, the traditional step-wise processes of monolithic imaging solutions have been isolated and separated into components that can be implemented independently, in many different ways. The operations for indexing, scanning and storing documents can be physically, temporally, and/or logically separated or disconnected. This allows optimized operational components to be assembled and implemented to best serve the needs of the users of the system. Finally, this compartmentalized digital filing process also provides a way for portions of the process to be outsourced to third party service providers that are logically disconnected from the indexing process. Control over the document is maintained by the user from initial receipt to the final disposition of the document and the transition of the paper-based document to a digital image.

For example, indexed and labeled documents can be scanned at a third party service provider location where the scanning subsystem will know how to name the image files based on the bar-coded information printed on the document label. Since these third party vendors will not be part of a dedicated system, the document input mechanism will not be logically connected to the computer system that indexed the documents. Digital images of the paper-based documents can be written to a removable, transportable image storage media (CD-ROM, DVD, etc.) for return to the originating system, where the existing image index database 228 will know how to access the images based on the globally unique identifier. And/or, the images can be physically stored at a third party service provider facility, such as an Internet Service Provider, because image retrieval requests are web browser-based, employ Internet conventions, standard client-server processes, and reference a document number which identifies the document owner and coincides with the globally unique document filename/identifier at the designated location. Once again, image storage mechanism 130 is normally not logically connected to computer 200 at the time of image scanning or image storage, only at the time of image retrieval. This is in direct contrast to the traditional monolithic document imaging systems or hybrid outsourcing services of the past and is possible because the user of system 100 indexes the document and the system creates the storage file name/identifier for each document before the document is scanned, using the pre-printed globally unique identifier.

Digital filing application 227 can be provided as a single-user product and in network-capable versions. For the network version, image repository 226 and image index database 228 may reside on a server connected to any network, an Intranet, or the Internet. For networking environments, digital filing application 227 is downloaded from the network and the images, document numbers, and image index database records are all transferred via network connections and standard network interactions.

In addition, by implementing the user interface for the digital filing system as a web browser plug-in or JAVA applet, the standards, availability, functionality, and features of web browsers can be leveraged and utilized to great advantage. For example, the imaging engines already used by web browsers for viewing images can be used to provide on-screen visual representations for the imaged documents. An imaged document may be stored using the industry standard image formats known to those skilled in the art or later adopted in the industry. Since most standard web browsers can already read and display these various image formats, or automatically invoke other resources (i.e. third party document viewer web browser plug-ins) to display these standard image formats, there is no need to develop or provide proprietary image display, print, fax, e-mail, etc. mechanisms.

By establishing an open image file storage system where the image indexes are managed and maintained by a standard SQL database, the images are easily imported or exported into more sophisticated storage systems as the need arises. Since the digital images are stored in non-proprietary formats and are accessible via standard software packages, the digital images are easily transferred from one hardware/software platform to another. This feature allows a user and third party applications (document management systems, workflow systems) to easily access or change image repository storage facilities or to simply move document images from system to system as the user's needs change. The use of unique globally unique identifiers also assures that documents from different systems can be combined into a single image repository while maintaining each document's unique identity.

Further, by isolating the indexing operation from the scanning and storage operation and by isolating the scanning operation from the indexing and storage operation, significant advantages can be realized. Specifically, it is anticipated that commercial third party service providers such as Kinkos® and AlphaGraphics® which provide service centers at various locations nationwide will enter the document scanning market. A user can index and apply a labels to documents in a batch, then transport the batch of indexed documents to a third party scanning service provider. The service provider scans the previously indexed documents and stores digital images of the documents onto a recordable, transportable media (i.e., CD-ROM, DVD, etc). The third party scanning service provider's software is an extension of digital filing application 227 and will, therefore, be capable of naming the digital images using the globally unique identifier contained in each document's bar code portion 420. When the transportable media is re-introduced to system 100 a the user's location, image index database 228 can locate the scanned images by using the globally unique identifier, which is now related to the image file name, or is the image file name. As an alternative to transportable media, images can be moved from a scan service provider back to the user site by any known communication lines. This method of outsourced scanning allows users to implement digital filing without incurring the costs of procuring dedicated scanning subsystems. Third party scanning can also be used for bulk, backfire conversions of existing documents.

Another important aspect of the present invention is the independence of the globally unique identifier on the label and the document to which it is attached. In the various preferred embodiments of the present invention, there is no pre-determined or pre-established relationship between any given label and any given document. The labels can be assigned to any random document in any desired order without adhering to any specific document content-related protocol.

This is in stark contract to most known digital filing systems that rely on a pre-determined relationship between a document and the label. For example, many systems have established that a certain label must be placed on certain documents, in order to use the information contained on the label in the document storage/retrieval process. While useful in some highly structured filing applications, this requirement is too rigid and structured for many ad hoc filing systems. Accordingly, the methods of the present invention do not rely on this artificial constraint to relate the digital image to the paper-based document. Instead, the globally unique identifier on the pre-printed label serves to tie any given pre-printed label to any given document, merely by placing the pre-printed label on the document and "synchronizing" the globally unique identifier used by digital filing application 227 with the globally unique identifier printed on the pre-printed label. If the same document is scanned or imaged more than one time, then each subsequent image is "versioned" or appended to the database with a new number. This allows for a document history to be created as a paper-based document travels through multiple stages as an information container.

Finally, third party document image storage providers and outsourced filing providers can allocate storage space (logical and physical) for a user's paper-based documents and the document images without worrying about the details of indexing and scanning. Digital copiers, traditional scanners, fax machines, or similar machines modified for this specific purpose, can be used to scan and transmit images to third party image storage providers. Images can be transmitted over standard dial-up lines (like a present day fax transmission), dedicated communication lines, or the Internet.

Users will be able to rent or lease storage space for their document images and may outsource the storage of the paper-based documents to outsourcing service providers. By using web browser 225 and digital filing application 227, a user can navigate to the desired logical storage location and access the stored image files, wherever they may be physically stored. Additionally, the user may access the on-line image database and use the information contained in the logical record to located the physical location of the paper-based document. This allows businesses to quickly and affordably adopt digital filing solutions without the traditional cost of image storage systems. It also creates widely accessible image repositories on a cost-effective, secure basis.

As explained above, the present invention provides an apparatus and method for a digital filing system. The preferred embodiments of the present invention provide for easy and effective indexing, imaging, storing, retrieving and managing of paper-based documents, transforming them into electronic documents using a system which incorporates many existing office resources. The proposed system and method implements a desktop solution for digital filing, which can be made available to each worker. In one embodiment of the present invention, an individual has complete control over the electronic storage and retrieval of their documents from a standard desktop computer, using a dedicated digital filing application or a standard web browser application.

One of the more critical parts of the present solution is the maintenance of globally unique identifier. The integrity of document images can be assured by controlling the globally unique identifier. In addition, proprietary check digits, ensigns, and other secure printing techniques may be used to maintain the integrity of the digital filing process.

While the invention has been particularly shown and described with reference to preferred embodiments thereof, it will be understood by those skilled in the art that various changes in form and details may be made therein without departing from the spirit and scope of the invention.

What is claimed is:

1. An apparatus comprising:
   at least one processor;
   a memory coupled to the at least one processor;
   at least one digital image of a paper-based document, the digital image residing in the memory;
   a physical storage location for the paper-based document;
   a digital filing application residing in the memory and being executed by the at least one processor, the digital filing application extracting a globally unique identifier from the at least one digital image of the paper-based document and using the globally unique identifier to link the digital image to a computerized database record which was created prior to the creation of the digital image and which record contains information about the physical storage location for the paper-based document.

2. The apparatus of claim 1 wherein the digital filing application links the digital image to the database record by using at least a portion of the globally unique document number to create a file name for the digital image.

3. The apparatus of claim 2 wherein the at least a portion of the globally unique document number is the file name for the digital image.

4. The apparatus of claim 1 further comprising a communication link coupled to the at least one processor.

5. The apparatus of claim 4 wherein the communication link comprises a computer network.

6. The apparatus of claim 1 wherein the globally unique identifier comprises a number represented as a bar code embedded within the at least one digital image of the paper-based document.

7. The apparatus of claim 1 further comprising at least one file folder, the at least one file folder containing the paper-based document, the at least one file folder bearing a globally unique identifier.

8. The apparatus of claim 7 further comprising at least one storage container, the at least one storage container containing the at least one file folder, the at least one storage container bearing a globally unique identifier.

9. The apparatus of claim 1 further comprising:
   at least one file folder containing the paper-based document, the at least one file folder bearing a globally unique identifier; and
   at least one storage container containing the at least one file folder, the at least one storage container bearing a globally unique identifier.

10. A method comprising the steps of:
    creating a record in a database describing a paper-based document; the record identifying a physical storage location for the paper-based document;
    affixing a globally unique identifier to the paper-based document;
    processing the paper-based document to create a digital image of the paper-based document which includes the globally unique identifier;
    extracting the globally unique identifier from the digital image of the paper-based document;
    storing the digital image, using the globally unique identifier to link the digital image to the record in the database and to the physical storage location for the paper-based document.

11. The method of claim 10 further comprising the step of de-speckling and de-skewing the digital image of the paper-based document.

12. The method of claim 10 further comprising the step of using the record in the database to display the digital image of the paper-based document.

13. The method of claim 10 further comprising the step of using the record in the database to retrieve the paper-based document.

14. The method of claim 10 further comprising the steps of:
    using the record in the database to display the digital image of the paper-based document; and
    using the record in the database to retrieve the paper-based document.

15. The method of claim 10 further comprising the steps of:
    storing the paper-based document in at least one file folder, the at least one file folder bearing a globally unique identifier; and
    storing the at least one file folder in at least one storage container, the at least one storage container bearing a globally unique identifier.

16. The method of claim 15 further comprising the steps of:
    transporting the at least one storage container to a warehouse facility; and storing the at least one storage container in the storage facility.

17. A program product comprising:

a digital filing application which decodes at least one digital image of a paper-based document and which extracts a globally unique identifier from a label image contained within the at least one digital image and which uses the globally unique identifier to name and link the at least one digital image to a record in a database, wherein the record in the database identifies a physical storage location for the paper-based document and wherein the record was created at a point in time prior to the creation of the at least one digital image; and signal bearing media bearing the digital filing application.

18. The program product of claim 17 wherein the digital filing application is implemented as a web browser based application.

19. The program product of claim 17 wherein the signal bearing media comprises recordable media.

20. The program product of claim 17 wherein the signal bearing media comprises transmission media.

* * * * *